(12) United States Patent
Reisinger

(10) Patent No.: X7204
(45) Date of Patent: Aug. 18, 1832

(54) BEDSTEADS

(76) Inventor: Henry Reisinger

Henry Reisinger of York Pennsylvania
Letters Patent.

The Schedule referred to in these Letters Patent and making part
of the same containing a description in the words of the said
Henry Reisinger himself of his improvement in the Bedstead To all to whom these presents shall come. Be it Known that I
Henry Reisinger of York in the County of York and State of
Pennsylvania have invented a new and useful improvement
in the art of making Bedsteads and that the following is a full
and exact description of the construction and operation of
the said improvement as invented or improved by me,
This Bedstead differs from the common Bedstead in general.
The Bedstead to be of the ordinary length and Breadth say 6 feet
long and 4 feet wide between the posts. From the head post to
the centre of the upper shaft is 2 feet 7 inches. the shaft to
be made of hard wood two inches square with gudgeons on
each end. which are to be one and a half or two inches long
to extend or run into the centre of side rails.
There are two cross pieces of hard wood screwed on the
shaft extending from the head post to the semicircular rule
joint thro which there is to be a pin of hard wood or iron
put near the side rails. The length from the centre of the shaft
to the end of the rule joint to be 23 inches. from the foot
post to the other end of the Rule joint is twenty two inches.
The Bedstead to be made sufficiently high (say two feet
two inches to the top of the rail, with castors or rollers un-
derneath) to admit that part from the foot post to the rule
joint to fall and raise easily as this Bedstead can be convert-
ed into a Bed or seat at pleasure.
There are four upright square posts, two of which are
two inches from the rule joint to be of the same length as the other posts from the middle one to be mortised and tenoned
into the lower part of the said rail; the other two are each to
be twenty one inches from the long ones fastened into the
lower part of the side rail in the same way, having cross
pieces framed in said posts nine inches from the floor to
to the top of said cross pieces. There is to be a small iron
or wooden shaft round, or square parallel to the upper shaft
which is to work on the above described cross pieces, with a
box or covering screwed on the gudgeon to keep it to its place;
with one catch wheel on each end of said shaft and one crank
which can be moved to either side of the Bedstead. There is
also a connecting rod; 4 feet 4 inches long of hard wood
to work and rest on the shaft fastened to the lower side
of the foot rail; with a piece screwed on the foot rail with
a pin of wood or iron to let the rod work easy.
The rod to extend across the shaft three or four inches. There
are three leather straps to be fastened with rivets, the mid
dle leather to be precisely in the middle or centre of the
shaft. The other end of said middle leather to be fastened
to the rod. The other two to be fastened to the end of the cross
pieces above described as near the side rails as said cross pieces
are. The foot posts to consist of two parts to be made, or hung
with hinges and put up with small hooks and staples in
order to let down that part of the Bedstead which falls &
also fastend with hooks on the outside of the posts to keep
them secure or firm when the foot posts are on the floor
There may be a small pinion instead of the strap to work on
cogs screwed to the rod sufficiently long to let the falling part down
with a cross piece of wood with a wire spring between the piece
and the rail. The whole may be bottomed with straps of boards
from two to six inches broad which will suit better than
cord. One of the straps to be placed or fastened on the rails joint and rounded off to suit the joint. The advantages of this bedstead are as follows viz. First it raises the bedding or bottom and lets the head part stand firm 2.dly. It can be placed in any corner of the room and occupies no more space than the common Bed stead 3.dly You can let the foot part down and raise the head part so as to form a seat or bench Witnesses }
Adam King }
John A. Wilson }

Henry Keisinger ([illegible])

(Patented 18 August 18[illegible].)